United States Patent Office 3,441,831
Patented Apr. 29, 1969

3,441,831
DC TO AC CONVERTER
Tatsuo Goto and Takashi Nishimura, Tokyo, Japan, assignors to Hitachi, Ltd., Tokyo-to, Japan
Filed Nov. 29, 1966, Ser. No. 597,625
Claims priority, application Japan, Nov. 29, 1965, 40/72,872
Int. Cl. H02m 7/44, 7/68
U.S. Cl. 321—45
8 Claims

ABSTRACT OF THE DISCLOSURE

The disclosure provides a DC to AC converter comprising a pair of transistors alternately switched to the conductive state by respective outputs of a multivibrator connected thereto. The bases of each of the transistors of the multivibrator are connected through individual diodes to the base of the switching transistor controlled thereby so as to reverse bias the switching transistor during the non-conductive period of its operation. Reverse bias at the proper time is also provided by secondary timing circuits connected through diodes to the base of the switching transistors. Reverse bias is also derived from a separate winding on the coupling transformer to the load.

---

This invention relates to a periodic switching circuit for electric signal converters and the like, and more particularly to a periodic switching circuit using a multivibrator oscillator circuit.

Some electronic equipment mounted on transportation devices, such as automobiles, is commonly driven by alternating current power obtained by converting the direct current power of the battery to a pulsating signal. Accordingly, the direct current to alternating current converters used for such a purpose are required to be compact, easy to carry, highly efficient and inexpensive in cost.

As is well known, various types of direct current to alternating current converters have been proposed, and the most typical model of such a converter is the so-called Royer circuit which comprises a pair of switching transistors connected to each other in push-pull relation and to a transformer including an iron core which has a rectangular hysteresis characteristic. This Royer circuit has been disclosed in detail in the publication "Semiconductor Circuits Handbook" by Seymour Schwartz, published in 1960 by John Wiley & Sons, Inc., pp. 1–16. The Royer circuit, however, is more or less expensive because of its use of a transformer having a rectangular hysteresis characteristic, and, moreover, it has the disadvantage that the output frequency thereof tends to vary to a great extent with the variation of load.

Electric converters using a conventional transformer have also been proposed, and one example of such a converter has been disclosed in a Japanese Patent No. 291,-288, published on June 29, 1961 (Publication No. 8,966/61), which was filed by the assignee of the present invention on Aug. 24, 1959, in Japan. In this converter a multivibrator is used for periodically interrupting a pair of switching transistors. Accordingly, it is unnecessary in this circuit to use a transformer having a rectangular hysteresis characteristic. This particular converter, however, is unstable in operation, as hereinafter mentioned, and, therefore, is also unsuitable.

Accordingly, it is a main object of the present invention to provide an improved, periodic switching circuit for electric converters and the like.

Another object of the present invention is to provide a periodic switching circuit which is stable in its operation at all times.

Still another object of the present invention is to provide a periodic switching circuit, according to which the collector cut-off current of the transistors can be maintained at a low value during the non-conductive state thereof.

A further object of the present invention is to provide a periodic switching circuit which can be adapted to drive electromagnetic relays, such as pulse-driven relays.

According to the present invention, a multivibrator is arranged so as to periodically interrupt a pair of switching transistors connected in push-pull relation, thereby alternately interrupting the direct current flowing through the switching transistors. For this purpose, each of two outputs of the multivibrator is connected to the respective switching transistors directly, or through one or more amplifying transistors connected between the switching transistors and the multivibrator. According to the present invention, moreover, means for applying reverse bias voltages to the switching transistors during non-conduction of the control transistor connected thereto is specially provided, thereby at least one of the pair of transistors used in the circuit is forced to interrupt during its cut-off period.

These and other additional objects and advantages of the present invention will become more apparent from the following description, beginning with an explanation of a conventional circuit, when taken in connection with the accompanying drawing, in which.

Figure 1:
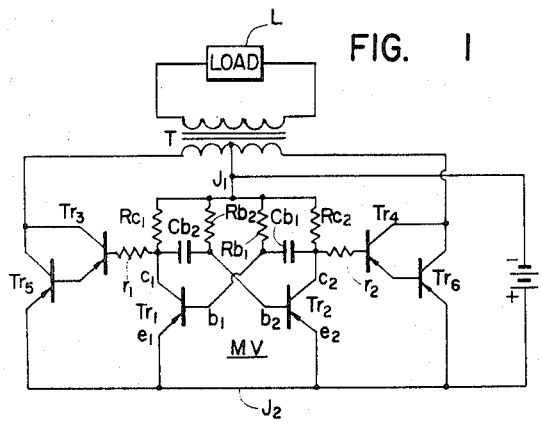
FIGURE 1 shows a schematic diagram of a conventional, electric signal converter using a multivibrator oscillator circuit.

Referring now to FIGURE 1, which illustrates an example of a conventional direct current to alternating current converter, an astable multivibrator indicated generally MV comprises transistors $Tr_1$ and $Tr_2$, capacitors $C_{b1}$ and $C_{b2}$, and resistors $R_{b1}$, $R_{b2}$, $R_{c1}$ and $R_{c2}$. Collectors $c1$ and $c2$ of the transistors $Tr_1$ and $Tr_2$ are connected to a negative terminal (—) of an electric battery E through the resistor $R_{c1}$ or $R_{c2}$, respectively. Emitters $e1$ and $e2$ of the transistors $Tr_1$ and $Tr_2$ are commonly connected to a positive terminal (+) of the battery E. A first time-constant circuit comprising the series combination of the capacitor $C_{b1}$ and the resistor $R_{b1}$ is connected between opposite ends of the collector resistor $R_{c2}$, and a second time-constant circuit comprising the series combination of the capacitor $C_{b2}$ and the resistor $R_{b2}$ is connected between opposite ends of the collector resistor $R_{c1}$. A base $b1$ of the transistor $Tr_1$ is connected to the junction point of the capacitor $C_{b1}$ and the resistor $R_{b1}$, and a base $b_2$ of the transistor $Tr_2$ is connected to the junction point of the capacitor $C_{b2}$ and the resistor $R_{b2}$. The common junction point $J_1$ of the resistors $R_{b1}$, $R_{b2}$, $R_{c1}$ and $R_{c2}$ and the battery E is connected to a central tap of a primary winding of an output transformer T.

Between the common junction point $J_2$ and the primary winding of the transformer T, switching transistors $Tr_5$ and $Tr_6$ are connected in push-pull relation, respectively. Moreover, each of a pair of amplifying transistors $Tr_3$ and $Tr_4$ is connected between the respective collector $C_1$ or $C_2$ of the transistor $Tr_1$ or $Tr_2$ and the switching transistor $Tr_5$ or $Tr_6$ through resistor $r_1$ or $r_2$. These amplifying transistors $Tr_3$ and $Tr_4$ are connected, respectively, to transistors $Tr_5$ and $Tr_6$ so as to constitute a so-called Darlington circuit. A Load L is connected between opposite ends of the secondary winding of the transformer T.

When the transistor $Tr_1$ is conductive and the transistor $Tr_2$ is non-conductive, the electric potential on the collector $c_1$ of the transistor $Tr_1$ is nearly zero, having a value $-Eco$. In contrast, the electric potential on the collector $c_2$ of the transistor $Tr_2$, which is non-conductive at this time, is nearly $-E$. At a certain instant, if the electric potential on the base $b_1$ is nearly zero, and if the electric potential on the base $b_2$ is positive, the transistor $Tr_1$ is maintained in conductive state and the transistor $Tr_2$ is maintained in non-conductive state. At the instant when the electric potential on the base $b_2$ of the transistor $Tr_2$ becomes zero as a result of the electric charge across the capacitor $Cb_2$ discharging through the resistor $Rb_2$, the transistor $Tr_2$ will be suddenly switched into the conductive state. At the same time, the potential on the collector $c_2$ suddenly rises up from $-E$ to zero. This potential variation is transmitted to the base $b_1$ of the transistor $Tr_1$ through the capacitor $Cb_1$, and the electric potential on the $b_1$ rises up from zero to $+E$. Consequently, the transistor $Tr_1$ is caused to suddenly switch from the conductive state into the non-conductive state. This is conventional multivibrator operation, which is well-known.

Figure 2:
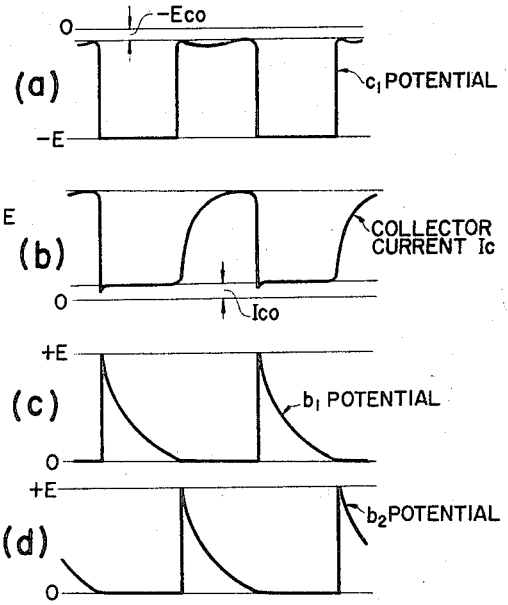
FIGURE 2 shows waveforms at various portions of the circuit of FIGURE 1.

The electric potential $+E$ on the base $b_1$ of the transistor $Tr_1$ namely, the electric charge across the capacitor $Cb_1$, discharges through the resistor $Rb_1$ and reduces toward zero potential. At the instant when the electric potential on the base $b_1$ of the transistor $Tr_1$ becomes zero, the transistor $Tr_1$ is suddenly switched from the non-conductive state into the conductive state. Consequently, the multivibrator MV is caused to alternately switch in the well-known manner with a certain period which is determined by the time-constant of the circuits $Cb_1$–$Rb_1$ and $Cb_2$–$Rb_2$. FIGURE 2(a) shows a waveform of the electric potential on the collector $c_1$ of the transistor $Tr_1$, and FIGURE 2(b) shows a waveform of collector current Ic of the transistor $Tr_1$. Although the waveform of the electric potential on the collector $C_2$ of the transistor $Tr_2$ and the waveform of the collector current of the same are omitted in the figures, it will be apparent that they are similar to the waveforms as shown in FIGURES 2(a) and (b), except for the well-known difference in the phase relation. Besides, FIGURES 2(c) and (d) show waveforms of the electric potentials on the bases $b_1$ and $b_2$ of both transistors $Tr_1$ and $Tr_2$, respectively.

Two outputs of the multivibrator MV are taken out from the collectors $c_1$ and $c_2$ of the transistors $Tr_1$ and $Tr_2$, and are supplied to the amplifying transistors $Tr_3$ and $Tr_4$ through the resistors $r_1$ and $r_2$, respectively. The amplified outputs of the transistors $Tr_3$ and $Tr_4$ control the switching transistors $Tr_5$ and $Tr_6$ so as to interrupt them alternately with a predetermined period. Consequently, the current which flows through both halves of the primary winding of the transformer T is periodically interrupted by the switching transistors $Tr_5$ and $Tr_6$, and then alternating current power can be taken out from the secondary winding of the transformer T.

The above-mentioned, direct current to alternating current converter has the advantages that the output frequency can be easily controlled and stabilized against variations of the load. With this arrangement it is also unnecessary to use an expensive transformer having a rectangular hysteresis characteristic as proposed at one time. In this converter, however, the collector cut-off current Ico characteristic of the amplifying transistors $Tr_3$ and $Tr_4$ and the switching transistors $Tr_5$ and $Tr_6$ provides for serious disadvantages in this system. That is to say; if considered with respect to the left half of the circuit of FIGURE 1, during the conductive state of the transistor $Tr_1$, the electric potential on the collector $c_1$ is maintained at or about zero, as shown in FIGURE 2(a). Consequently, the electric potentials on the bases of the switching transistor $Tr_5$ and the amplifying transistor $Tr_3$ are also maintained at about zero, and, as a result, both transistors $Tr_3$ and $Tr_5$ are maintained in the non-conductive state during the conductive state of the transistor $Tr_1$. However, it should be noticed that the electric potential on the collector $c_1$ of the transistor $Tr_1$ never becomes exactly zero due to the existence of voltage drop Eco between the collector $c_1$ and the emitter $e_1$, and due to such electric potential value, a certain small forward bias voltage is applied to both transistors $Tr_3$ and $Tr_5$.

Figure 3:
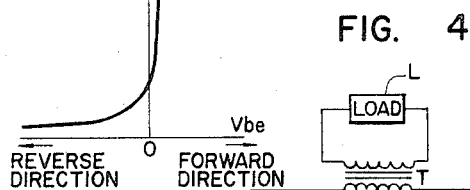
FIGURE 3 shows a collector current vs. bias voltage characteristic of a conventional transistor.

As shown in FIGURE 3, the collector current Ic of conventional transistors tends to greatly increase when the base-emitter bias voltage $Vbe$ thereof increases from zero in the forward direction, and, in contrast, such current tends to greatly decrease when such voltage $Vbe$ increases from zero in the reverse direction. Accordingly, the collector cut-off current Ico of the transistors $Tr_3$ and $Tr_5$ becomes large due to the small forward bias-voltage from transistor $Tr_1$, as mentioned above. This increase of Ico further brings about a great increase in the operating temperature of these transistors. Such rise in the operating temperature in turn causes increase in the collector cut-off current Ico, and so forth, until permanent damage to these transistors results from excessive heating. These are the reasons for which the converter circuit shown in FIGURE 1 has not been widely used in spite of its otherwise excellent properties and advantages.

Figure 4:
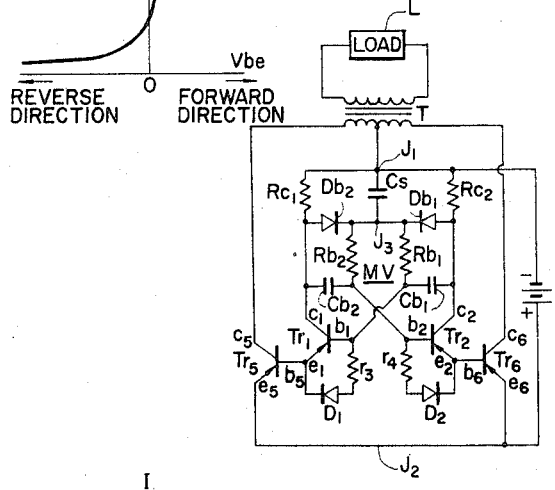
FIGURE 4 is a circuit diagram showing one embodiment of the present invention.

According to the present invention, special means for supplying reverse bias voltages to the switching transistors and the amplifying transistors of the known circuit of FIGURE 1 is provided for eliminating the inherent disadvantages in these circuits, as mentioned above. FIGURE 4 illustrates one embodiment of the present invention, in which the same reference numerals as those in FIGURE 1 are used to represent similar or corresponding elements whenever possible. In this circuit, the amplifying transistors $Tr_3$ and $Tr_4$ in FIGURE 1 are removed, and the transistors $Tr_1$ and $Tr_2$, constituting the electric multivibrator MV, are directly connected to the switching transistors $Tr_5$ and $Tr_6$, respectively. Moreover, a pair of diodes $D_{b1}$ and $D_{b2}$ are connected in opposing series relationship between collectors $c_1$ and $c_2$ of the transistors $Tr_1$ and $Tr_2$, and the time-constant circuit $R_{b1}$–$C_{b1}$ is connected between the collector $C_2$ of the transistor $Tr_2$ and the common junction point $J_3$ of the diodes $D_{b1}$ and $D_{b2}$. In a like manner the time-constant circuit $R_{b2}$–$C_{b2}$ is connected between the collector $c_1$ of the transistor $Tr_1$ and said common junction point $J_3$.

The diodes $D_{b1}$ and $D_{b2}$ are provided to prevent a misoperation of the multivibrator MV resulting in both transistors $Tr_1$ and $Tr_2$ becoming conductive at the same time. A capacitor $C_5$ is connected between the common junction points $J_1$ and $J_3$, which facilitates the starting of the multivibrator MV.

Between the bases $b_1$ and $b_2$ and the emitters $e_1$ and $e_2$, respectively, diodes $D_1$ and $D_2$ are inserted in series with resistors $r_3$ and $r_4$. In addition, the emitters $e_1$ and $e_2$ of the transistors $Tr_1$ and $Tr_2$ are directly connected to the respective bases $b_5$ and $b_6$ of the transistors $Tr_5$ and $Tr_6$. The diodes $D_1$ and $D_2$ are inserted between the base and emitter of transistor $Tr_1$ and $Tr_2$ so as to pass only the current from the bases $b_1$ and $b_2$ toward the emitters $e_1$ and $e_2$, respectively. Consequently, the positive potential on the base $b_1$ or $b_2$ as shown in FIGURE 2(c) or (d) is transmitted to the base $b_5$ or $b_6$ of the transistors $Tr_5$ or $Tr_6$ through the resistor $r_3$ or $r_4$ during the cut-off period of the respective transistor $Tr_1$ or $Tr_2$, so that the switching transistor $Tr_5$ or $Tr_6$ is forced to be non-conductive also at this time by the reverse bias. During the conductive period of the transistor $Tr_1$ or $Tr_2$, since the forward bias current from the battery E can flow through the emitter $e_5$ or $e_6$, the base $b_5$ or $b_6$, the emitter $e_1$ or $e_2$ and the base $b_1$ or $b_2$, the diode $D_1$ or $D_2$ becomes non-conductive, effecting no influence whatsoever on the transistors.

According to the present invention, during the cut-off period of the switching transistors, $Tr_5$ and $Tr_6$ reverse bias voltages are applied to these transistors, instead of forward bias, as in the known circuit operation with the result that the collector cut-off current of the switching transistors is maintained at an extremely small value. Consequently, the disadvantageous overheating of these transistors inherent in the operation of the known circuits is clearly avoided by relatively simple means while maintaining the basic advantageous properties of the known circuit.

Figure 5:
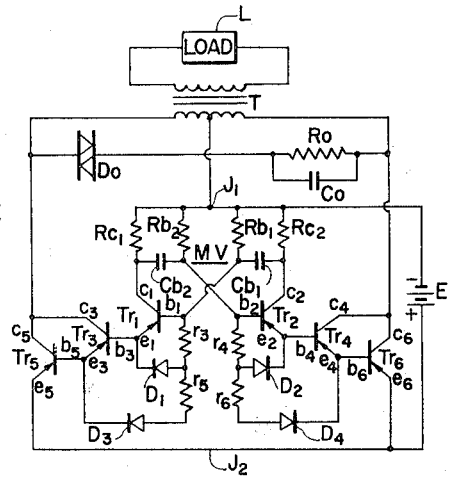
FIGURE 5 is a circuit diagram showing another embodiment of the present invention.

FIGURE 5 illustrates another embodiment of the present invention, in which the same reference numerals as those of FIGURE 1 are used to represent similar or corresponding elements whenever possible. In this case, amplifying transistors $Tr_3$ and $Tr_4$, each of which is inserted between the transistor $Tr_1$ or $Tr_2$ and the switching transistor $Tr_5$ or $Tr_6$, serves the same function as in the circuit of FIGURE 1. Moreover, a spike-voltage preventing circuit comprising a resistor $Ro$, a capacitor $Co$ and a semiconductor alternating-current controlling element $Do$, is connected between the collectors $C_5$ and $C_6$ of the switching transistors $Tr_5$ and $Tr_6$. Diodes $D_1$, $D_2$, $D_3$ and $D_4$ are also provided for applying the reverse bias voltages (the positive potentials) to the amplifying transistors $Tr_3$ and $Tr_4$ and the switching transistors $Tr_5$ and $Tr_6$, respectively, as in the circuit of FIGURE 4. The diodes $D_1$ and $D_2$ are connected between the bases $b_1$ and $b_2$ of the transistor $Tr_1$ and $Tr_2$ and the bases $b_3$ and $b_4$ of the amplifying transistors $Tr_3$ and $Tr_4$ through resistors $r_3$ and $r_4$, respectively, so as to pass only the current flowing from the base $b_1$ or $b_2$ toward $b_3$ or $b_4$. The diodes $D_3$ and $D_4$ are connected between the junction point of the resistors $r_3$ and $r_4$ and the diodes $D_1$ and $D_2$, and the bases $b_5$ and $b_6$ of the switching transistor $Tr_5$ and $Tr_6$, respectively, so as to pass only the current flowing from the base $b_1$ or $b_2$ toward $b_5$ or $b_6$. Since these diodes $D_1$, $D_2$, $D_3$ and $D_4$ operate similarly to the diodes $D_1$ and $D_2$ of FIGURE 4, the respective transistors $Tr_3$, $Tr_4$, $Tr_5$ and $Tr_6$ are forced to a non-conductive state during the cut-off period thereof by the reverse bias voltages applied from the base $b_1$ or $b_2$ of the transistor $Tr_1$ or $Tr_2$.

Figure 6:
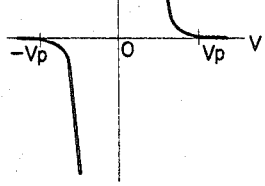
FIGURE 6 shows a voltage vs. current characteristic of the alternating current controlling element used in the circuit of FIGURE 5.

At an instant when the circuit is switched from one state into the other state, a spike-voltage is generated on the collectors of the transistors $Tr_5$ and $Tr_6$, and such voltage tends to damage the transistors. This disadvantage can be eliminated by use of the spike-voltage preventing circuit inserted between the collectors of the transistors $Tr_5$ and $Tr_6$. That is to say; semiconductor alternating-current controlling element $Do$ has such a voltage vs. current characteristic, as shown in FIGURE 6, that the component of the spike-voltage in excess of a certain value $Vp$ is effectively absorbed by such element $Do$. This semiconductor alternating-current controlling element $Do$ is generally known as a "Diac" (General Electric Co.) or "Biac" (Hitachi, Ltd.).

Figure 7:
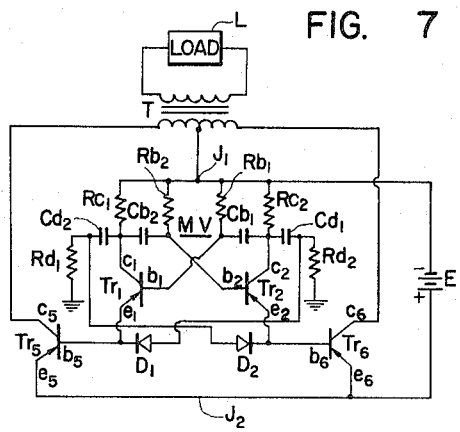
FIGURES 7 and 10 are circuit diagrams showing still other embodiments of the present invention.
Figure 8:
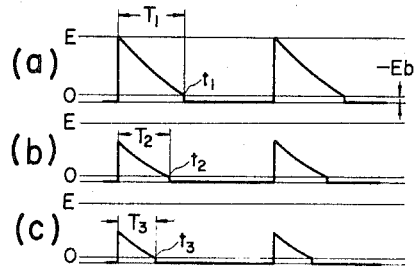
FIGURE 8 is a characteristic diagram for explaining the variation of the waveform of electric potential on the bases of the transistors used in the multivibrator shown in FIGURES 4 and 5.

The embodiment of the invention shown in FIGURE 7 is a converter circuit having an improved stability against variation in temperature. In the embodiments of the invention shown in FIGURES 4 and 5, a small part of the positive charge on the capacitor $C_{b1}$ or $C_{b2}$ tends to discharge through the bases and the collectors of the switching transistors $Tr_5$ or $Tr_6$ and the amplifying transistors $Tr_3$ or $Tr_4$ during the cut-off period thereby reverse biasing these transistors. This reverse bias current is subject to the influence of temperature variation, and, as a result, the waveform of the electric potential on the base $b_1$ or $b_2$ of the transistor $Tr_1$ or $Tr_2$ varies with the temperature variation, as shown in FIGURE 8. FIGURE 8(a) shows the waveform of the electric potential on the base $b_1$ or $b_2$ of the transistor $Tr_1$ or $Tr_2$ under optimum conditions. Correctly speaking, the base potential of the transistor $Tr_1$ or $Tr_2$, which is in the conductive state, is maintained at a small negative value $-Eb$ determined by the voltage drop between the base $b_1$ or $b_2$ and the respective emitter $e_1$ or $e_2$. The transistor $Tr_1$ or $Tr_2$ is switched from the non-conductive state into the conductive state at an instant when the base potential curve crosses with the zero line, this instant being shown by reference $t_1$ in FIGURE 8(a). As mentioned above, since a part of the electric charge on the capacitor $C_{b1}$ or $C_{b2}$ discharges through the diode $D_1$ and $D_3$ or $D_2$ and $D_4$ to the switching transistor $Tr_5$ or $Tr_6$ and the amplifying transistor $Tr_3$ or $Tr_4$, the electric potential on the base $b_1$ or $b_2$ of the transistor $Tr_1$ or $Tr_2$ is reduced, as shown in FIGURE 8(b). Consequently, the switching time of the transistor $Tr_1$ or $Tr_2$, namely, the crossing point of the base potential with the zero potential, is caused to move from $t_1$ to $t_2$, as shown in FIGURE 8(b), and the period of the non-conductive state of the transistor shortens from $T_1$ to $T_2$. If the operating temperature of the switching transistors $Tr_5$ and $Tr_6$ and the amplifying transistors $Tr_3$ and $Tr_4$ increase, the reverse bias currents of these transistors increase with the temperature, and then the period of the non-conductive state of the tranresistor $Tr_1$ and $Tr_2$ shortens more and more, as shown in FIGURE 8(c). Consequently, it is difficult to maintain the stable operation of the circuit against the temperature variation in the case where transistors of large capacity are used for switching or amplifying elements.

Figure 9:
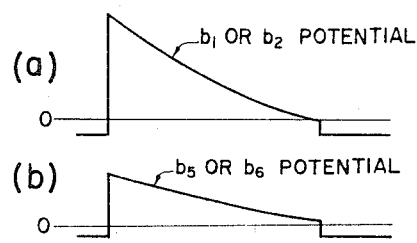
FIGURES 9 and 11 show waveforms of the reverse bias voltages provided in the embodiments of FIGURES 7 and 10 respectively.

For the purpose of eliminating the disadvantage mentioned above, the embodiment of the invention illustrated in FIGURE 7 is provided with a second pair of time-constant circuits, each of which comprises a capacitor $C_{d1}$ or $C_{d2}$ connected with the collector $c_1$ or $c_2$ of the transistor $Tr_1$ or $Tr_2$ and a resistor $R_{d1}$ or $R_{d2}$ connected between the capacitor $C_{d1}$ or $C_{d2}$ and ground. In addition, the reverse bias supplying diodes $D_1$ and $D_2$ are connected between the junction point of the capacitor $C_{d1}$ or $C_{d2}$ and the resistor $R_{d1}$ or $R_{d2}$. At an instant when the transistor $Tr_1$ or $Tr_2$ is switched from the non-conductive state into the conductive state, a positive potential is produced on the junction point of the resistor $R_{d1}$ or $R_{d2}$ and the capacitor $C_{d1}$ or $C_{d2}$, and this positive potential is transmitted to the base $b_5$ or $b_6$ of the switching transistor $Tr_5$ or $Tr_6$ through the diode $D_1$ or $D_2$. Consequently, the electric potential on the base $b_5$ or $b_6$ is maintained at a positive value during a period determined by the time-constant of the circuit $C_{d1}$-$R_{d2}$ or $C_{d2}$-$R_{d2}$, and the switching transistor $Tr_5$ or $Tr_6$ is maintained in the non-conductive state during the same period. In this case, if the circuit constant of the circuit $C_{d1}$-$R_{d1}$ and $C_{d2}$-$R_{d2}$ is so selected that the time-constant of such circuits is more or less large in comparison with the time-constant of the circuit $C_{b1}$-$R_{b1}$ and $C_{b2}$-$R_{b2}$, the non-conductive period of the switching transistor $Tr_5$ and $Tr_6$ is fixed to a certain value determined by the time-constant of the circuit $C_{b1}$-$R_{b1}$ and $C_{b2}$-$R_{b2}$, because the positive potential on the base $b_5$ or $b_6$ is cancelled by the switch in condition of transistor $Tr_1$ or $Tr_2$ from non-conductive state to conductive state. FIGURE 9(a) shows a waveform of the base potential of the transistor $Tr_1$ and $Tr_2$, and FIGURE 9(b) shows a waveform of the base potential of the transistor $Tr_5$ and $Tr_6$.

According to the embodiment shown in FIGURE 7, since the magnitude of the base potential of the transistors $Tr_1$ and $Tr_2$ is not subject to the influence of the reverse bias current of the switching transistors $Tr_5$ or $Tr_6$, the multivibrator circuit becomes stable against temperature variation.

Figure 10:
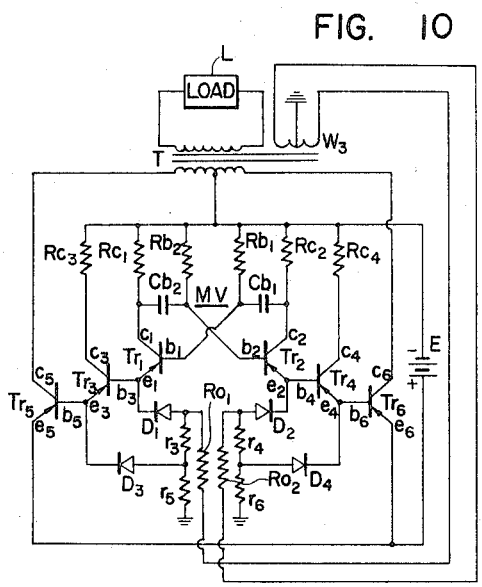
Figure 11:
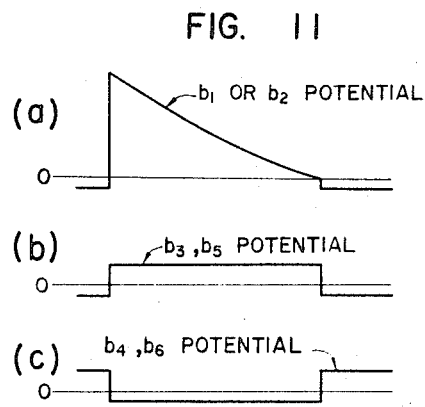

FIGURE 10 illustrates a circuit arrangement, in which the reverse bias voltages are obtained from a third winding W3 of the transformer T. Since the central tap of the third winding W3 is grounded, two controlling signals having a rectangular alternating waveform of opposite polarity are taken out from the opposite ends of this winding, and the reverse bias voltages, as shown in FIGURES 11(b) and (c), are supplied to the switching transistors $Tr_5$ and $Tr_6$ and the amplifying transistors $Tr_3$ $Tr_4$ through stabilizing resistors $r_{01}$ and $r_{02}$. Consequently, the amplifying transistor $Tr_3$ or $Tr_4$ and the switching transistor $Tr_5$ or $Tr_6$ can be maintained in non-conductive state during their cut-off period by reverse bias. In this embodiment, the value of the reverse bias voltages to be required is generally less than 0.5 volt. Thus, only a few turns of the third winding is required. If necessary, such signals are obtained by electrically dividing the load voltage with the aid of suitable diodes can be also used for the reverse bias voltages of the switching transistors and the amplifying transistors.

Figure 12:
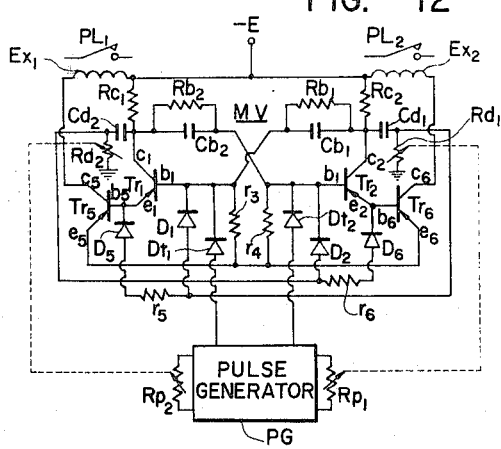
FIGURE 12 is a circuit diagram showing a relay-driving circuit forming part of the present invention.

FIGURE 12 illustrates a driving circuit for pulse-driven relays using the periodic switching circuit of the present invention, in which a bistable multivibrator (flip-flop circuit) MV comprising transistors $Tr_1$ and $Tr_2$ capacitors $C_{b1}$ and $C_{b2}$ and resistors $R_{b1}$ and $R_{b2}$ is provided for alternately interrupting the switching transistors $Tr_5$ and $Tr_6$. Diodes $Dt_1$ and $Dt_2$ are provided for supplying trigger pulses, and the bistable multivibrator MV is caused to alternately switch due to the trigger pulses supplied from a pulse generator PG through the respective diodes $Dt_1$ and $Dt_2$. Consequently, the two outputs of the bistable multivibrator MV control the switching transistor $Tr_5$ and $Tr_6$ so as to alternately interrupt them, and exciting windings $Ex_1$ and $Ex_2$ of pulse-driven relays $PL_1$ and $PL_2$ are alternately excited. The reverse bias stabilizing voltages are derived from the time-constant circuits $C_{d1}$-$R_{d1}$ and $C_{d2}$-$R_{d2}$, which are of the same construction as the corresponding circuits in FIGURE 7. In this case, however, the reverse bias voltages are also applied to the bases $b_1$ and $b_2$ of the transistors $Tr_1$ and $Tr_2$ through diodes $D_5$ and $D_6$. Moreover, the resistors $R_{d1}$ and $R_{d2}$ are constituted so as to be variable, and they are operatively interlocked with variable resistors $Rp_1$ and $Rp_2$ for adjusting the pulse period of the pulse generator PG. Consequently, the period of application of the reverse bias voltages can be adjusted with the variation of the period of the pulse generated in the pulse generator DG. This circuit can be used for driving circuits of vibration-type electric motors.

In the above description, the circuits have been illustrated as using p-n-p type transistors; however, it will be apparent that it is possible to provide the circuits with n-p-n type transistors.

Furthermore, while we have shown and described only a few exemplary embodiments of the present invention, it will be understood that this invention is not limited thereto but is susceptible of numerous changes and modifications as known to a person skilled in the art.

We claim:
1. A periodic switching circuit for electric converters and the like comprising; a multivibrator oscillator circuit including a pair of control transistors for generating first and second control signals, a direct current source, a pair of switching transistors connected in parallel relation between opposite terminals of said direct current source, means supplying said first and second control signals to respective switching transistors, for effecting alternate conduction thereof, means for supplying reverse bias voltages to each of said switching transistors only during the respective non-conductive states thereof, and means for extracting interrupted current generated by said switching transistors, further including a pair of amplifying transistors, each of which is inserted between a respective one of said control transistors of said multivibrator and the switching transistor controlled thereby; and said reverse bias voltage supplying means comprising at least two pairs of diodes, each one of one pair of said diodes being connected between the base of a respective one of said control transistors of said multivibrator and the base of one of said switching transistors controlled thereby, and each diode of another pair of said diodes being connected between the base of a respective one of said control transistors and the base of the respective one of said amplifying transistors connected thereto.

2. A periodic switching circuit according to claim 1, further including spike-voltage preventing means connected between the collectors of said switching transistors for absorbing voltage surges above a certain magnitude.

3. A periodic switching circuit according to claim 2, wherein said spike-voltage preventing means consists of the parallel combination of a resistor and a capacitor in series with a Biac element.

4. A periodic switching circuit for electric converters and the like comprising; a multivibrator oscillator circuit including a pair of control transistors for generating first and second control signals, a direct current source, a pair of switching transistors connected in parallel relation between opposite terminals of said direct current source, means supplying said first and second control signals to respective switching transistors, for effecting alternate conduction thereof, means for supplying reverse bias voltages to each of said switching transistors only during the respective non-conductive states thereof, and means for extracting interrupted current generated by said switching transistors, in which said reverse bias voltage supplying means comprises; a pair of time-constant circuits, each of which consists of a resistor and a capacitor connected to the collector of a respective one of said control transistors; and a pair of diodes, each of which is connected between a respective time-constant circuit at the junction point of said resistor and capacitor and the base of the respective one of said switching transistors whose collector is connected to the other time-constant circuit.

5. A periodic switching circuit for electric converters and the like comprising; a multivibrator oscillator circuit including a pair of control transistors for generating first and second control signals, a direct current source, a pair of switching transistors connected in parallel relation between opposite terminals of said direct current source, means supplying said first and second control signals to respective switching transistors, for effecting alternate conduction thereof, means for supplying reverse bias voltages to each of said switching transistors only during the respective non-conductive states thereof, and means for extracting interrupted current generated by said switching transistors, further including a pair of amplifying transistors, each of which is inserted between a respective one of said control transistors and the switching transistor controlled thereby; and said reverse bias voltage supplying means comprising a pair of time-constant circuits, each of which consists of a series connection of a resistor and a capacitor connected to the collector of a respective one of said control transistors, and two pairs of diodes; each of one pair of said diodes being connected between a respective time-constant circuit at the junction point of said resistor and capacitor and the base of the respective one of said switching transistor whose collector is connected to the other time-constant circuit; and each of another pair of said diodes being connetced between a respective junction point and the base of the respective amplifying transistor connected to the switching transistor whose collector is connected to the other time-constant circuit.

6. A periodic switching circuit for electric converters and the like comprising; a multivibrator oscillator circuit including a pair of control transistors for generating first and second control signals, a direct current source, a pair of switching transistors connected in parallel relation between opposite terminals of said direct current source, means supplying said first and second control signals to respective switching transistors, for effecting alternate conduction thereof, means for supplying reverse bias voltages to each of said switching transistors only during the respective non-conductive states thereof, and means for extracting interrupted current generated by said switching transistors, wherein said means for extracting interrupted current consists of a transformer having a primary winding connected between the collectors of said switching transistors, a secondary winding, and a third winding, and further including a pair of amplifying transistors, each of which is inserted between a respective one of said control transistors and the switching transistor controlled thereby, and said reverse bias voltage supplying means comprising at least two pairs of diodes, each one of one pair of diodes being connected between the base of a respective one of said control transistors and a respective side of said third winding, and each diode of another pair of said diodes being connected between the base of a respective one of said amplifying transistors and the same side of said third winding as the corresponding diode of said one pair.

7. A periodic switching circuit according to claim 4, wherein said multivibrator is a bistable circuit, and further including pulse generating means, and a second pair of diodes each connecting said pulse generating means to the base of a respective one of said iontrol transistors so as to switch said control transistors alternately between the conductive and non-conductive states.

8. A periodic switching circuit according to claim 7, further including means simultaneously controlling said pulse generating means and said time-constant circuits for adjusting the period of said switching circuit.

References Cited

UNITED STATES PATENTS

| | | | |
|---|---|---|---|
| 2,838,675 | 6/1958 | Wanlass | 331—113 |
| 3,099,787 | 7/1963 | Elovic | 321—45 |
| 3,177,422 | 4/1965 | Schlereth | 321—45 |
| 3,227,965 | 1/1966 | Madsen et al. | 331—113 |
| 3,340,480 | 9/1967 | Snyder | 321—20 XR |
| 3,365,650 | 1/1968 | Camp et al. | 321—45 XR |

JOHN F. COUCH, *Primary Examiner.*

W. M. SHOOP, Jr., *Assistant Examiner.*

U.S. Cl. X.R.

331—113